March 21, 1967 R. E. KING 3,309,785
APPARATUS FOR FORMING A GAS-SOLIDS SUSPENSION
Filed Oct. 23, 1964 3 Sheets-Sheet 1
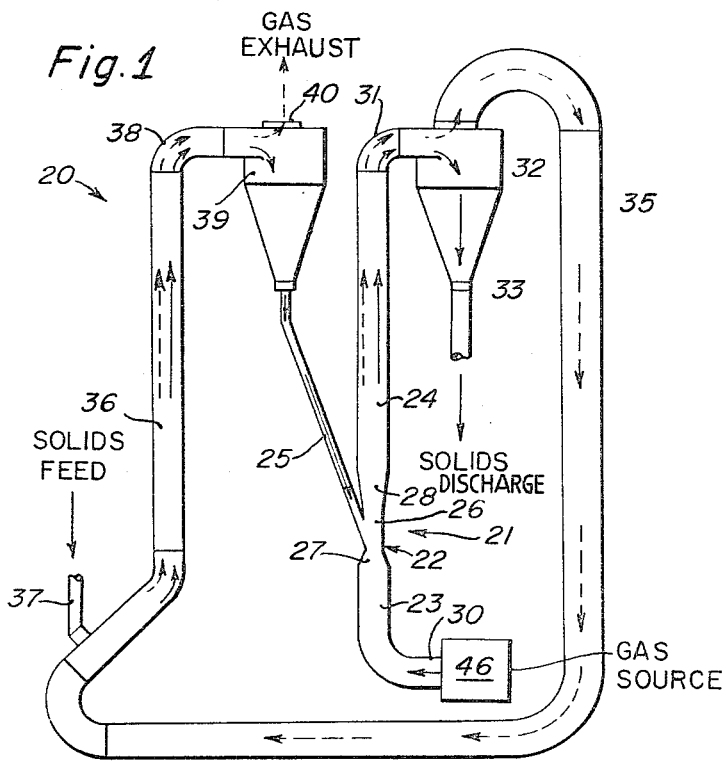
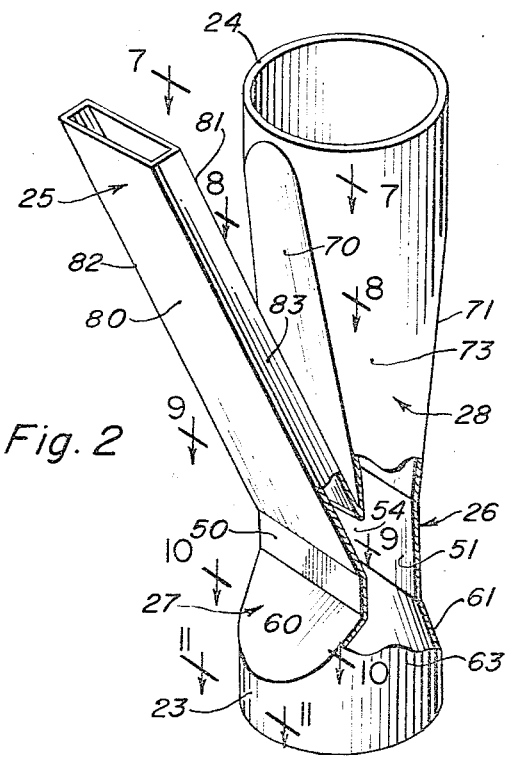
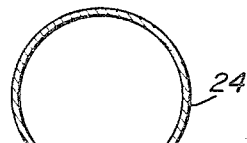
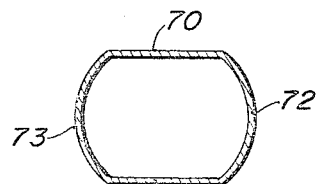
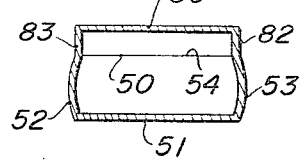
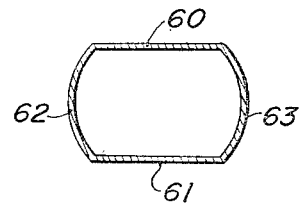
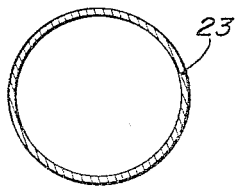
INVENTOR.
RICHARD E. KING
BY Merriam, Smith & Marshall
ATTORNEYS.

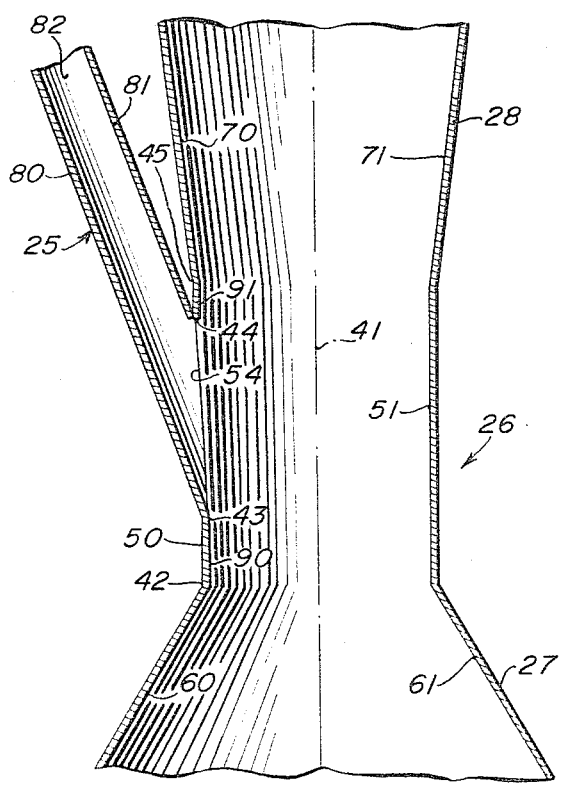
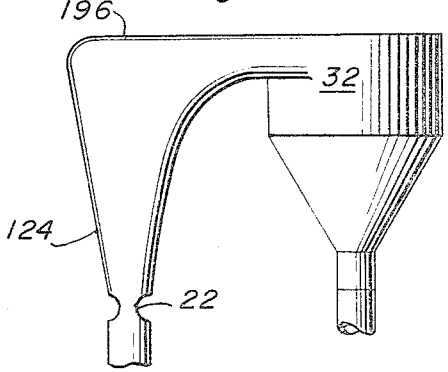
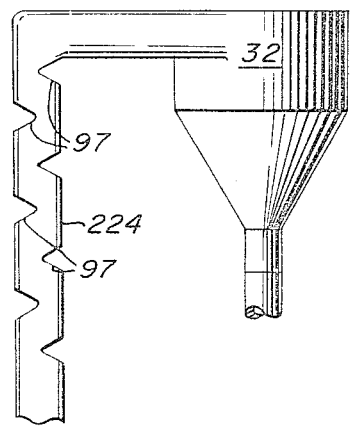
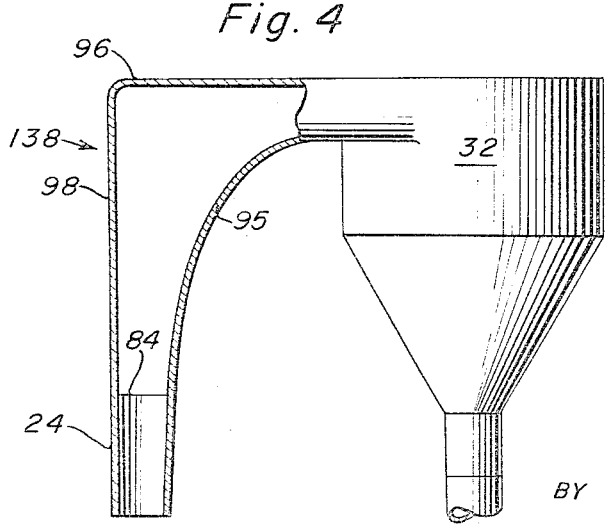

March 21, 1967  R. E. KING  3,309,785
APPARATUS FOR FORMING A GAS-SOLIDS SUSPENSION
Filed Oct. 23, 1964  3 Sheets-Sheet 3

INVENTOR.
RICHARD E. KING
BY Merriam, Smith & Marshall
ATTORNEYS.

United States Patent Office 3,309,785
Patented Mar. 21, 1967

3,309,785
APPARATUS FOR FORMING A GAS-SOLIDS
SUSPENSION
Richard E. King, Duluth, Minn., assignor to Northern
Natural Gas Company, Omaha, Nebr., a corporation
of Delaware, and W. S. Moore Co., Duluth, Minn.
Filed Oct. 23, 1964, Ser. No. 406,134
21 Claims. (Cl. 34—57)

This is a continuation-in-part of application Ser. No. 396,603 filed Sept. 15, 1964.

The present invention relates generally to apparatus for forming gas-solids suspensions, and for treating the solids with the gas in which they are suspended. More particularly, the invention relates to apparatus for introducing freely falling solid particles into an upwardly moving stream of gas to form an upwardly moving gas-solids suspension, with the apparatus providing a maximum rate of feed for the freely falling solid particles and minimizing the turbulence along the path followed by the gas and by the suspension.

The subject apparatus includes a vertically disposed venturi communicating, at its upstream end, with a first vertically disposed conduit and communicating, at its downstream end, with a second vertically disposed conduit. Communicating with the venturi is an upwardly extending tube for introducing solid particles into the venturi. The first conduit, the venturi and the second conduit define an upwardly extending path along which a stream of gas is flowed. A gas-solids suspension is formed in the venturi and moves downstream upwardly through the second conduit to a gas-solids separator.

In a typical embodiment the solids is iron ore having a particle size less than 10 standard mesh, and the gas is a reducing gas (e.g., carbon monoxide and/or hydrogen). The gas enters the first conduit at a typical speed of 32–40 feet per second and the iron ore particles are reduced by the gas while the former are suspended in the latter. The apparatus is constructed in a manner to be subsequently described in detail, which permits a maximum feed rate of solid particles into the gas stream at the venturi, and in a manner which, at the same time, minimizes turbulence along the entire gas path as well as minimizing back turbulence in the solids-feed tube and at the junction of the latter with the venturi. Back turbulence is undesirable because it interferes with solids feed into the venturi. Turbulence along the gas path is undesirable because it interferes with the desired movement of the gas and/or of the gas-solids suspension.

The apparatus is constructed in a manner which provides a relatively longer residence time for larger solid particles within the structure defining the gas path, in situations where a relatively wide range of sizes exists in the particles introduced into the venturi; and the apparatus includes features which prevent the relatively larger particles from settling to the bottom of the vertically disposed first conduit located below the venturi.

Other features and advantages are inherent in the structure claimed and disclosed or will become apparent to those skilled in the art from the following detailed description in conjunction with the accompanying diagrammatic drawings wherein:

FIGURE 1 is a schematic illustration of a system for handling a gas-solids suspension and which includes an embodiment of apparatus constructed in accordance with the present invention;

FIGURE 2 is a fragmentary perspective view, partially cut away and partially in section, showing a portion of an embodiment of apparatus constructed in accordance with the present invention;

FIGURE 3 is a vertical sectional view of a portion of an embodiment of the apparatus;

FIGURE 4 is an elevational view, partially cut away and partially in section, illustrating a portion of another embodiment of the apparatus;

FIGURE 5 is a fragmentary elevational view of a portion of still another embodiment of the apparatus;

FIGURE 6 is a fragmentary elevational view of a portion of a further embodiment of the apparatus;

FIGURES 7 through 11 are sectional views taken along lines 7—7 to 11—11, respectively, in FIGURE 2.

Figure 12:
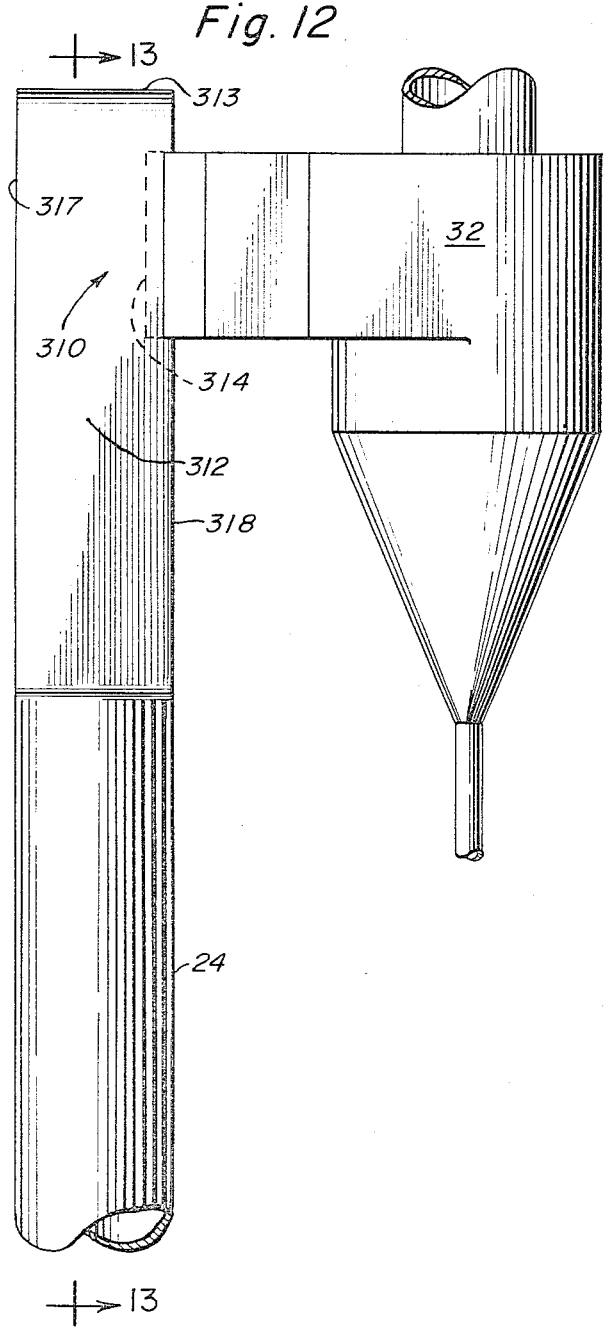
FIGURE 12 is an elevational view of a portion of another embodiment of the apparatus.

Referring initially to FIGURE 1, there is indicated generally at 20 a system for handling a gas-solids suspension. System 20 includes apparatus, indicated generally at 21, for forming an upwardly moving gas-solids suspension; and apparatus 21 includes a vertically disposed venturi, indicated generally at 22, a first vertically disposed conduit 23 located below or upstream of venturi 22, and a second vertically disposed conduit 24 located above or downstream of venturi 22.

Communicating with the bottom of first conduit 23 is a gas inlet 30 through which gas is introduced from a gas source 46 (e.g., a gas furnace with blower) for movement along a gas path defined by first conduit 23, venturi 22 and second conduit 24.

Solid particles are introduced into venturi 22 from a tube 25 extending angularly upwardly from the venturi. The gas velocity and solids particle size are so related that a suspension of solid particles in gas is formed in the vicinity of venturi 22, and the suspension flows upwardly from venturi 22 through second conduit 24.

Communicating with the top of second conduit 24, through an elbow 31, is a conventional gas-solids separator 32. The gas and solids in the suspension are separated from each other in separator 32, with solids being discharged from the bottom of separator 32, at 33, and with gas being exhausted from separator 32 into a conduit 35 for movement therethrough.

System 20 is described in greater detail in the present inventor's copending application Ser. No. 396,603 referred to above. For purposes of background illustration, the rest of system 20, illustrated in FIGURE 1, includes a riser 36 having a bottom end communicating with conduit 35, an elbow 38 at the top of riser 36 communicating riser 36 with a second gas-solids separator 39, and means, at 37, for introducing solid particles into the gas stream moving through conduit 35 into riser 36. The gas leaving separator 32 passes through conduit 35, is mixed with solid particles from 37 to form another gas-solids suspension; and this other suspension moves upwardly through riser 36 and elbow 38 into separator 39. Solids are separated from the gas in separator 39 for discharge into tube 25; and gas is exhausted from separator 39 at 40.

Although the embodiment of FIGURE 1 illustrates a separator 39 as the source of solids introduced into tube 25, in other embodiments of the subject apparatus the source of solid particles introduced into tube 25 may be something other than a gas-solids separator, e.g., a hopper or the like; and, in such an embodiment, conduit 35, solids feed 37, riser 36, elbow 38 and separator 39 may be eliminated.

Describing apparatus 21, and particularly venturi 22, in greater detail, reference is made to FIGURES 2, 3 and 8 through 10.

Venturi 22 includes a venturi throat zone 26, a venturi approach zone 27 between first conduit 23 and venturi throat zone 26, and a venturi recovery zone 28 between second conduit 24 and venturi throat zone 26.

Venturi throat zone 26 has a pair of flat parallel sides 50, 51 and a pair of curved sides 52, 53 (FIG. 9) each extending between said flat sides 50, 51. Flat side 50 has an opening 54 defined by the junction with flat side 50 of tube 25 (FIGS. 3 and 9).

Venturi approach zone 27 has a pair of flat sides 60, 61, converging from first conduit 23 to venturi throat zone 26, and a pair of curved sides 62, 63 each extending between flat sides 60, 61 (FIG. 10).

Venturi recovery zone 28 has a pair of flat sides 70, 71, diverging from venturi throat zone 26 to second conduit 24, and a pair of curved sides 72, 73 each extending between flat sides 70, 71 (FIG. 8).

Each flat side 50, 51 on venturi throat zone 26 is continuous with a respective flat side 60, 61 on the venturi approach zone 27 and with a respective flat side 70, 71 on the venturi recovery zone 28. Each curved side 52, 53 on the venturi throat zone 26 is continuous with a respective curved side 62, 63 on venturi approach zone 27 and with a respective curved side 72, 73 on venturi recovery zone 28.

The curved sides 62, 63 of venturi approach zone 27 are continuous with portions of the interior wall of first conduit 23; and the curved sides 72, 73 of venturi recovery zone 28 are continuous with portions of the interior wall of second conduit 24.

Referring to FIGURES 2 and 3, the angle between a flat side 60, 61 of venturi approach zone 27 and the longitudinal center line or axis 41 of the venturi is no greater than 30°; and the angle between a flat side 70, 71 of venturi recovery zone 28 and the longitudinal center line or axis 41 of the venturi is no greater than 7°. Providing the approach zone and the recovery zone with flat sides having the angles described above minimizes the turbulence in the approach zone and in the recovery zone.

First and second conduits 23, 24 each have a substantially circular cross-section, or, at the very least, an inner periphery essentially curved in its entirety. A cross-section of this nature minimizes turbulence within the conduit. A polygonal conduit cross-section would cause turbulence unless there were a very large number of small sides (e.g., 10 or 12), and then the cross-section would be essentially circular.

The comparative diameters of conduits 23, 24 depend upon the comparative gas temperatures in the respective conduits and upon whether addition of solids at venturi 22 causes a higher or lower gas temperature in conduit 24. The lower the temperature, the smaller the conduit to give the desired gas velocity.

Tube 25 has a rectangular cross-section (FIG. 2) defined by a pair of relatively wide flat sides 80, 81 and a pair of relatively narrow flat sides 82, 83. The cross-sectional area of tube 25 may be determined by considerations described in detail in said copending application Ser. No. 396,903.

In one embodiment of use of the subject apparatus, the solids undergo treatment by the gas with which the solids are in suspension. This treatment takes place substantially in that part of the apparatus extending upwardly from the venturi and including second conduit 24. It is important that the solids be reacted with the gas for a time sufficient to produce the results desired. The larger solid particles require a longer reaction time than do the smaller particles. Accordingly, means are provided in the subject apparatus to extend the length of time during which at least the larger solid particles may react with the gas.

Means of this nature includes providing a solids-feed tube 25 extending upwardly from venturi 22 at an angle which permits free fall of the solid particles descending through tube 25. Thus, the solid particles entering venturi 22 have a downward velocity component at the time they enter venturi 22; and at least the larger particles descent downwardly into venturi approach zone 27, and even into first conduit 23, before the downward velocity component is overcome by the upward force of the gas moving upwardly through conduit 23 and venturi 22. The larger the particle, the further downwardly toward and into first conduit 23 the particle will fall before its direction of movement is reversed by the upward movement of the gas. Therefore, the larger particles will move along a longer part of the gas path defined by first conduit 23, venturi 22 and second conduit 24 than will the smaller particles; and because the distance along which the larger particles move in contact with the gas is increased, the reaction time with the gas is increased.

To provide the desired free fall for particles moving through tube 25, the tube should extend upwardly from venturi 22 at an angle of at least about 70° from the horizontal.

Because increased residence time for at least the larger particles is provided by constructing the apparatus with a tube 25 which permits free fall of the particles into the venturi, the length of second conduit 24 may be relatively small in comparison to the length which would be required if increased reaction time between the larger particles and the gas were provided by extending conduit 24 further upwardly.

It is undesirable for free falling solid particles to descend so far into lower conduit 23 that they settle at the bottom thereof, because this requires periodic cleaning to prevent a buildup which could obstruct the gas flow from gas inlet 30. Accordingly, conduit 23 extends sufficiently downwardly from venturi 22 to allow the upwardly moving gas stream to reverse the descent of the particles. In a typical embodiment of apparatus wherein maximum particle sizes are less than 10 standard mesh, and the gas velocity is 32–40 feet per minute, a conduit 23 having a length at least 1.5 times its diameter would suffice to prevent particles from settling at the bottom of the conduit.

The cross-sectional configuration of venturi throat zone 26 is illustrated in FIGURE 9; and, as seen from FIGURES 7–11, the cross-sectional area of the venturi throat zone is less than the cross-sectional area of the apparatus at any other location along the gas path defined by first conduit 23, venturi 22 and second conduit 24. Accordingly, the velocity pressure is greatest and the static pressure is smallest at the venturi throat zone 26 in comparison to the respective velocity and static pressures at any other location along said gas path.

Particles descending through tube 25 flow along the inner surface of side 80, this being the lower of the two sides 80, 81. It is important that the rate of flow through tube 25 be at a maximum, for economy of operation, among other reasons. Because solid particles descending through tube 25 move downwardly along side 80, the rate of solids flow through tube 25 is governed by the width of side 80 (i.e., the dimension of side 80 between sides 82 and 83). The width of side 80 is dependent upon the width of opening 54, and this opening dimension in turn is dependent upon the width of flat side 50 of venturi throat zone 26 (i.e., the dimension of flat side 50 between curved sides 52, 53).

Accordingly, to assure maximum solids feed into venturi 22 it is important to maximize the width of flat side 50; and this width depends upon the cross-sectional area of venturi throat zone 26 (said cross-sectional area being determined essentially by the width of flat sides 50, 51 and by the distance between flat sides 50, 51). This cross-sectional area is governed by the static pressure desired to be provided in the venturi throat zone, (and this is explained in greater detail in said copending application No. 396,903). Accordingly, if the width of side 50 is to be increased, the other significant cross-sectional dimension of the throat zone, namely the distance between flat sides 50, 51, must be decreased.

Therefore, to provide a venturi throat zone having a cross-sectional area which imparts the desired pressure drop in the throat zone, and to provide an opening into the throat zone which imparts the maximum feed rate to solid particles entering the venturi for a given cross-sectional area of the throat zone, it is necessary to have a flat side 50 which has a width substantially greater than the distance between parallel flat sides 50, 51. If flat side 50 had a width which would provide the desired rate of solids feed flow, but the distance between flat sides 50, 51 were relatively large compared to the width of flat side 50, the cross-sectional area in the throat zone 26 would be relatively large and the resulting static pressure drop would be relatively small and less than that required. As previously indicated, the throat zone's static pressure and cross-sectional area (transverse to axis 41 of the venturi) must be less than at any other location along the gas path.

In accordance with the present invention, the subject apparatus is provided with a venturi throat zone having the desired relatively small cross-sectional area while at the same time providing a flat side 50 which is sufficiently wide to permit an opening 54 therein of sufficient width to allow a maximum solids feed rate through tube 25 into venturi 22. Thus, flat side 50 of venturi throat zone 26 has a width, measured in a direction transverse to the axis of or to the direction of gas flow through venturi 22, substantially greater than the distance between the parallel flat sides 50, 51 of the venturi throat zone 26 (said distance constituting a dimension transverse to both the axis 41 of venturi 22 and the width flat side 50). In many embodiments the width of flat side 50 is greater than the respective diameters of conduits 23, 24.

Another feature of an embodiment of the subject apparatus is providing the venturi throat zone 26 with a dimension, along venturi axis 41 (FIG. 3) in the direction of gas flow through the venturi, no greater than 1.5 times the distance between parallel flat sides 50, 51 of throat zone 26 as measured at the upstream end of the throat zone. This minimizes turbulence within the venturi throat zone.

More specifically, as the gas stream flows from tapering venturi approach zone 27 to venturi throat zone 26, the gas stream is constricted to a cross-sectional area which is less than the cross-sectional area of the venturi throat zone. The amount of constriction which the gas stream undergoes depends upon the narrowest dimension of the throat zone cross-section. This is the distance between parallel sides 50, 51 at the upstream end 42 of the throat zone (FIG. 3). As the gas stream moves downstream from end 42 through the throat zone, it expands from its previously constricted cross-section; and, by the time the gas stream has moved a distance greater than 1.5 times the narrowest dimension of the cross-section, the cross-sectional area of the constricted gas stream will be equal to or have a tendency to exceed the cross-section of the throat zone at the location of constriction (the upstream end 42 of the throat zone). If the venturi does not expand in cross-section at the same time as the cross-section of the gas stream expands beyond the cross-sectional dimensions of the venturi throat zone, the gas stream will impinge against the sides of the venturi, thus creating turbulence.

In accordance with the present invention, the venturi throat zone terminates before the gas stream has a chance to expand to a cross-section equal to or tending to exceed the cross-section of the venturi throat zone. It is for this reason that the dimension of the venturi throat zone, in the direction of gas flow through the throat zone, is no greater than 1.5 times the distance between the parallel flat sides 50, 51 of the throat zone at its upstream end 42.

Opening 54 in flat side 50 has an upstream edge 43 and a downstream edge 44 (FIG. 3). The upstream edge 43 is located downstream of the upstream end 42 of flat side 50, the location of greatest constriction for the gas stream; and the distance between 42 and 43 is sufficient to accommodate wear along the upstream edge 43 of the opening resulting from the abrasion of moving solid particles descending through opening 54 into venturi throat zone 26. This will assure that the distance between flat side 50 and flat side 51 at the venturi throat zone's upstream end 42 is at least the same as the distance between flat side 50 and flat side 51 at the downstream end 45 of throat zone 26.

It is important that the distance between flat sides 50, 51 at the throat zone's downstream end 45 always be no less than equal to the distance between sides 50, 51 at the throat zone's upstream end 42. If the distance between sides 50, 51 at the downstream end 45 were smaller than the distance between these two sides at upstream end 42, there would be a gas constriction at downstream end 45 with a smaller pressure at the downstream end 45 than at upstream end 42, which is undesirable because it would cause turbulence and interfere with the pressure balance of the system.

To further insure that the distance between sides 50, 51 at downstream end 45 is never less than the distance between these two sides at upstream end 42, flat side 50 is provided with two portions, an upstream portion 90 and a downstream portion 91 with the distance between downstream portion 91 and opposite flat side 51 being slightly greater than the distance between upstream portion 90 and opposite flat side 51. Upstream portion 90 of flat side 50 is located between upstream end 42 of the throat zone and upstream edge 43 of opening 54; while downstream portion 91 of flat side 50 is located between downstream edge 44 of opening 54 and downstream end 45 of throat zone 26.

It is important that upstream opening end 44 be located in the venturi throat zone at a location before the venturi cross-section starts to expand, in many embodiments, for pressure-balancing and back turbulence-avoiding purposes.

In one embodiment the subject apparatus may have the following dimensions. The length of the various venturi zones, in the direction of gas flow is: approach zone—21 inches; throat zone—4.5 inches; recovery zone—94.5 inches. The width of flat side 50 of the venturi throat zone is 15 inches compared to a lower conduit diameter of 12 inches and an upper conduit diameter of 14.5 inches. The distance between flat side 51 and upstream portion 90 of flat side 50 is 3.25 inches, and the distance between flat side 51 and downstream portion 91 of flat side 50 is .12 inch greater. The distance between upstream end 42 and opening upstream edge 43 is 1 inch. The venturi is vertical and the solids feed tube extends from the venturi at an angle of 20° from vertical.

Because there is a tendency for flat side 51 to be eroded away by rebounding solid particles more rapidly than opposite flat side 50 or than other portions of the apparatus, the interior surface of flat side 51 is, in a preferable embodiment of the apparatus, lined with a material substantially more wear-resistant than the material of construction of flat side 50. In situations where heated gas is flowed upwardly through the venturi, flat side 50 and most of the rest of the gas path is lined with a refractory material and flat side 51 is lined with silicon carbide to provide the dual function of refractory lining and wear-resistant lining.

As previously indicated, it is desirable, in many uses of the subject apparatus, to increase the residence time, in the above-defined gas path, of the larger particles contained in the gas-solids suspension. Embodiments of additional structural means for accomplishing this function are illustrated in FIGURES 4, 5 and 6.

More specifically, referring to FIGURE 4, the upper end 84 of second conduit 24 communicates with an elbow 138 including a lower wall portion 95 adjacent to and curved toward separator 32 and a wall portion, opposite curved wall portion 95, having an upwardly extending first part 98 terminating at a substantially horizontally disposed second part 96 extending from first part 98 to separator 32. As the gas-solids suspension moves upwardly into elbow 138, the smaller particles in the suspension will follow a path closely adjacent to curved wall portion 95 of elbow 138, while a typical larger particle will, because of its increased momentum (due to the larger mass thereof), proceed along a more vertically disposed path which causes it to strike horizontally extending wall part 96. Typically, the larger particles rebound downwardly from horizontally disposed wall part 96 until eventually the downward rebound movement is reversed by the upward flow of gas and the particles are once again carried in an upward direction. Some of the particles which underwent a first rebound will typically undergo a second and additional rebound, but eventually the rebounded larger particles will be carried into separator 32. As a result of having been subjected to one or more rebounds in elbow 138, the larger particles will have spent a greater length of time in contact with the reaction gas, thus providing the increased reaction time desired.

Referring to FIGURE 5, the embodiment illustrated therein includes a second conduit 124 which is upwardly and outwardly flared all the way from its upstream end adjacent venturi 22 to its downstream end adjacent separator 32. This embodiment includes a horizontally extending wall part 196 at the top of conduit 124 which performs the same function as the horizontally extending wall part 96 in the embodiment illustrated in FIGURE 4.

Referring to FIGURE 6, there is illustrated an embodiment of a second conduit 224 comprising structure, including means 97 within the second conduit extending in a direction having a horizontal component, which defines a tortuous path for the gas-solids suspension. In the embodiment of FIGURE 6, the smaller particles will like the gas, follow a tortuous path through conduit 224; whereas larger particles will typically strike against means 97, and be deflected downwardly a short distance before resuming movement through the tortuous path; thus increasing the residence time of the larger particles, in conduit 24, compared to the residence time of the smaller particles moving upwardly through this conduit.

Figure 13:
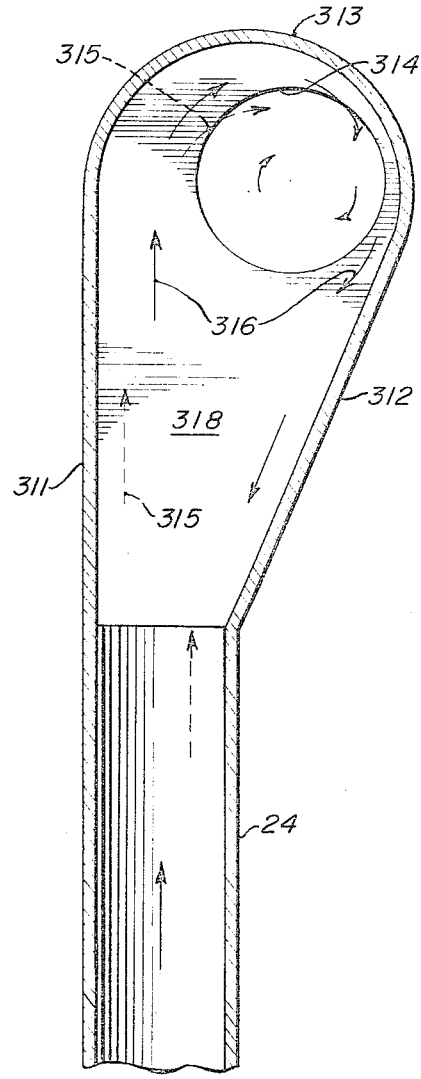
FIGURE 13 is a sectional view taken along lines 13—13 in FIGURE 12.

Referring to FIGURES 12 and 13, second conduit 24 communicates at its upper end with vertically disposed scroll means 310 located between conduit 24 and separator 32. Scroll 310 includes a vertical side 311, constituting an upward continuation of a vertical side of conduit 24, an upwardly and outwardly inclined side 312 opposite and diverging from side 311 and an inwardly concave curved top side 313 between the upper ends of sides 311 and 312. Located between sides 311 and 312 are sides 317 and 318. Scroll 310 has an opening 314 centered about a point closer to side 312 than to side 311. The axis of opening 314 is at right angles to the direction of flow of gas-solids suspension in conduit 24 and to the axis of conduit 24. The entrance to scroll 310, at the bottom thereof, has the same axis as conduit 24.

As the gas-solids suspension moves upwardly into scroll 310, the smaller solid particles follow a path, indicated by dotted arrows 315, whcih is a relatively direct path through opening 314. The larger particles follow a path defined by solid arrows 316 and become caught up in a cyclone whirling about opening 314. The cyclonic action throws the larger particles against walls 313 and 312 at the top of scroll 310; and the larger particles, thus deflected, fall by gravity and are again caught up in the flow of the suspension. Eventually a circulating load of larger particles builds up in scroll 310 with the load increasing until the rate at which solids leave through opening 314 equals the rate at which solids arrive in scroll 310.

The foregoing detailed description has been given for clearness of understanding only, and no unnecessary limitations should be understood therefrom, as modifications will be obvious to those skilled in the art.

What is claimed is:
1. Apparatus for forming a gas-solids suspension, said apparatus comprising:
 a venturi throat zone;
 a first conduit, upstream of said venturi throat zone, with an inner periphery curved in its entirety;
 a gas source in communication with said first conduit;
 a second conduit, downstream of said venturi throat zone, with an inner periphery curved in its entirety;
 a venturi approach zone between said first conduit and the venturi throat zone;
 a venturi recovery zone between said second conduit and the venturi throat zone;
 said venturi zones and said conduits defining a path for movement of gas from the beginning of the first conduit to the end of the second conduit;
 said venturi throat zone having a pair of flat parallel sides and a pair of curved sides each extending between said flat sides;
 said venturi approach zone having a pair of flat sides, converging from the first conduit to the venturi throat zone, and a pair of curved sides each extending between said flat sides;
 said venturi recovery zone having a pair of flat sides, diverging from the venturi throat zone to the second conduit, and a pair of curved sides each extending between said flat sides;
 each flat side on the venturi throat zone being continuous with a respective flat side on the venturi approach zone and with a respective flat side on the venturi recovery zone;
 each curved side on the venturi throat zone being continuous with a respective curved side on the venturi approach zone and with a respective curved side on the venturi recovery zone;
 the cross-sectional area of said venturi throat zone being less than the cross-sectional area at any other location along said gas path;
 the distance between parallel flat sides of the venturi throat zone being less than the smallest interior dimension, measured in a direction transverse to the direction of gas flow, at any other location along said gas path;
 a first flat side of said venturi throat zone having a width, measured in a direction transverse to the direction of gas flow through the venturi throat zone, substantially greater than said distance between the parallel flat sides of the venturi throat zone;
 a tube having one end joining the venturi throat zone at said first flat side;
 and an opening in said first flat side defined by the junction therewith of said one end of said tube;
 said gas path extending in an upward direction;
 said tube extending angularly from said junction with the venturi throat zone, and in an upward direction.

2. Apparatus as recited in claim 1 wherein:
 said conduits have circular interior cross-sections;
 the curved sides of the venturi approach zone are continuous with portions of the interior wall of the first conduit;
 and the curved sides of the venturi recovery zone are continuous with portions of the interior wall of the second conduit.

3. Apparatus as recited in claim 1 wherein:
 the angle between a flat side of the venturi approach zone and the longitudinal center line of the venturi approach zone is no greater than 30°;
 and the angle between a flat side of the venturi recovery zone and the longitudinal center line of the venturi recovery zone is no greater than 7°.

4. Apparatus as recited in claim 1 wherein the dimension of the venturi throat zone, in the direction of gas flow through the throat zone, is no greater than 1.5 times the distance between the parallel flat sides of the throat zone at the upstream end of said throat zone.

5. Apparatus as recited in claim 1 wherein the interior of the other flat side of the venturi throat zone, opposite said first flat side, is lined with a material substantially more wear-resistant than the material of construction of said first flat side.

6. Apparatus as recited in claim 5 wherein:
the interior of said first flat side is composed of refractory material;
and the interior of said other flat side of the venturi zone is lined with silicon carbide.

7. Apparatus as recited in claim 1 wherein said tube extends upwardly from said junction with the venturi throat zone at an angle which provides free fall for solid particles moving downwardly through said tube.

8. Apparatus as recited in claim 7 wherein said tube extends upwardly at an angle of at least about 70° from horizontal.

9. Apparatus as recited in claim 7 wherein:
said width of the first flat side of the venturi throat zone is substantially greater than the dimension of said flat side measured in the direction of gas flow through the throat zone;
and said opening in said first flat side is elongated in a direction transverse to said direction of gas flow.

10. Apparatus as recited in claim 9 wherein the elongated dimension of said opening is substantially coextensive with the width of the first flat side of the throat zone.

11. Apparatus as recited in claim 9 wherein:
said first flat side of the throat zone has an upstream end and a downstream end;
said opening in the first flat side has an upstream edge and a downstream edge;
said upstream edge of the opening being located downstream of the upstream end of the first flat side a sufficient distance to accommodate wear, along the upstream edge of the opening, by solid particles descending through said opening;
that portion of the first flat side, between the downstream edge of the opening and the downstream end of the first flat side, being spaced apart from the other parallel flat side of the venturi throat zone a distance greater than the distance between said other parallel flat side and the portion of the first flat side between the upstream end of the first flat side and the upstream edge of said opening.

12. Apparatus as recited in claim 1 and comprising:
gas-solids separation means at the downstream end of said second conduit;
said second conduit extending in a vertical direction and including means for increasing the residence time, in said second conduit, of the larger solid particles in a gas-solids suspension moving upwardly through said second conduit.

13. Apparatus as recited in claim 12 wherein said means for increasing the residence time of the larger solid particles comprises:
elbow means connecting the second conduit to said separator means;
said elbow means having a lower wall portion adjacent to and curved toward said separator means;
said elbow means having a wall portion opposite said curved wall portion and including an upwardly extending first part terminating at a substantially horizontally disposed second part extending from the first part to said separator means;
whereby smaller solid particles in said suspension follow a path adjacent said curved wall portion and larger solid particles follow a path which causes them to collide with said horizontally extending part.

14. Apparatus as recited in claim 13 wherein said second conduit is upwardly and outwardly flared from its upstream end to its downstream end.

15. Apparatus as recited in claim 12 wherein said means for increasing the residence time of the larger solid particles comprises means within said second conduit, and including means extending in a direction having a horizontal component, defining a tortuous path for said suspension.

16. Apparatus as recited in claim 1 wherein said tube extends upwardly from said junction with the venturi throat zone at an angle which provides free fall for solid particles moving downwardly through said tube;
said apparatus including means for introducing a volume of gas into said apparatus at a rate sufficient to suspend and carry, at any location along said gas path, the largest solid particles introduced into said apparatus;
and said first conduit extends vertically downwardly, from the downstream end thereof, a distance greater than the descent, due to gravity alone, of the free falling larger solid particles entering said venturi throat zone at said opening, whereby said larger particles are suspended in the gas stream moving upwardly through the first conduit before said particles have fallen to the bottom of the first conduit.

17. In apparatus for forming a gas-solids suspension:
a vertically disposed venturi throat zone having a pair of inwardly concave curved sides and a flat side therebetween;
a tube, having one end joining said venturi throat zone at said flat side thereof, and extending angularly from the junction with the venturi throat zone and in an upward direction;
and an opening, in the flat side of the venturi throat zone defined by the junction of said tube's one end with said flat side.

18. In apparatus as recited in claim 17 wherein:
the width of said flat side, measured in a direction transverse to the axis of the throat zone, being substantially greater than any cross-sectional dimension of the throat zone measured in a direction transverse to said flat side and transverse to the axis of the throat zone;
said opening being elongated in the direction of said width of the flat side and being coextensive with the width of the flat side.

19. In apparatus as recited in claim 17 and comprising:
a vertically disposed other venturi zone, continuous with said venturi throat zone, and having a pair of inwardly concave curved sides and a flat side therebetween;
said flat side on the other ventiuri zone being continuous with the flat side on the throat zone and extending angularly outwardly therefrom;
each of said curved sides on the venturi approach zone being continuous with a respective curved side on the throat zone;
the largest cross-sectional area of said throat zone, transverse to the axis of the venturi, being less than the transverse cross-sectional area at any location in the other venturi zone.

20. Apparatus as recited in claim 12 wherein said means for increasing the residence time of the large particles comprises vertically disposed scroll means between said second conduit and said separator, said scroll means comprising:
an entrance, at the lower end of the scroll means, having the same axis as said second conduit;
means, at the upper end of the scroll means, for forming a cyclone from a gas stream directed upwardly through said scroll means;
an exit opening, at said cyclone forming means;
said exit opening having an axis at right angles to the axis of said entrance to the scroll means.

21. In combination:
an upwardly extending conduit;
a venturi having one open end in communication with the bottom of said conduit;

a gas source in communication with the other open end of said venturi;
an opening in said venturi;
a tube having one end terminating at said opening in the venturi, said tube extending upwardly therefrom;
vertically disposed scroll means located at the top of said conduit;
said scroll means having an entrance at its lower end in communication with said conduit;
means, at the upper end of the scroll means, for forming a cyclone from a gas stream directed upwardly through said scroll means;
and an exit opening, at said cyclone-forming means; said exit opening having an axis transverse to the direction of movement of said upwardly directed gas stream.

References Cited by the Examiner
UNITED STATES PATENTS

| | | | |
|---|---|---|---|
| 2,406,395 | 8/1946 | Noel | 34—10 |
| 2,782,018 | 2/1957 | Bradford | 263—21 |
| 3,140,863 | 7/1964 | Forsyth et al. | 263—21 |

DONLEY J. STOCKING, *Primary Examiner.*

FREDERICK L. MATTESON, JR., *Examiner.*

D. A. TAMBURRO, *Assistant Examiner.*